United States Patent [19]

Sakai

[11] Patent Number: 5,124,874
[45] Date of Patent: Jun. 23, 1992

[54] PROTECTIVE DEVICE FOR ELECTRIC CONTROL CIRCUITS

[75] Inventor: Tadashi Sakai, Toyoake, Japan

[73] Assignee: Hoshizaki Denki Kabushiki Kaisha, Aichi, Japan

[21] Appl. No.: 493,655

[22] Filed: Mar. 15, 1990

[30] Foreign Application Priority Data

Mar. 16, 1989 [JP] Japan .................................. 1-64572

[51] Int. Cl.$^5$ ................................................ H02H 3/26
[52] U.S. Cl. ............................................ 361/86; 361/91; 307/127; 323/301
[58] Field of Search .................... 361/187, 91, 86, 60, 361/33, 77, 76, 84; 363/142, 143; 307/127, 130, 87, 86, 85; 323/301, 302

[56] References Cited

U.S. PATENT DOCUMENTS 4,068,276 1/1978 Pintel ....................................... 361/91
4,837,672 6/1989 Donze ..................................... 361/87

Primary Examiner—A. D. Pellinen
Assistant Examiner—C. S. Schultz
Attorney, Agent, or Firm—Nikaido, Marmelstein, Murray & Oram

[57] ABSTRACT

A protective device for an electric control circuit having first and second input buses to be applied with a source voltage of low level from a commercially available source of electricity and an electrical load of low rating voltage connected between the input buses. The protective device is in the form of a switchover relay disposed between the input buses and the electrical load for maintaining the electrical load in connection to the input buses when applied with the source voltage of low level and for disconnecting the elecrical load from the input buses when applied with a source of high level from the source of electricity. The operating voltage of the switchover relay is determined to be higher than a maximum allowable voltage of the electrical load and to be lower than a lower limit value of the source voltage of high level.

6 Claims, 1 Drawing Sheet

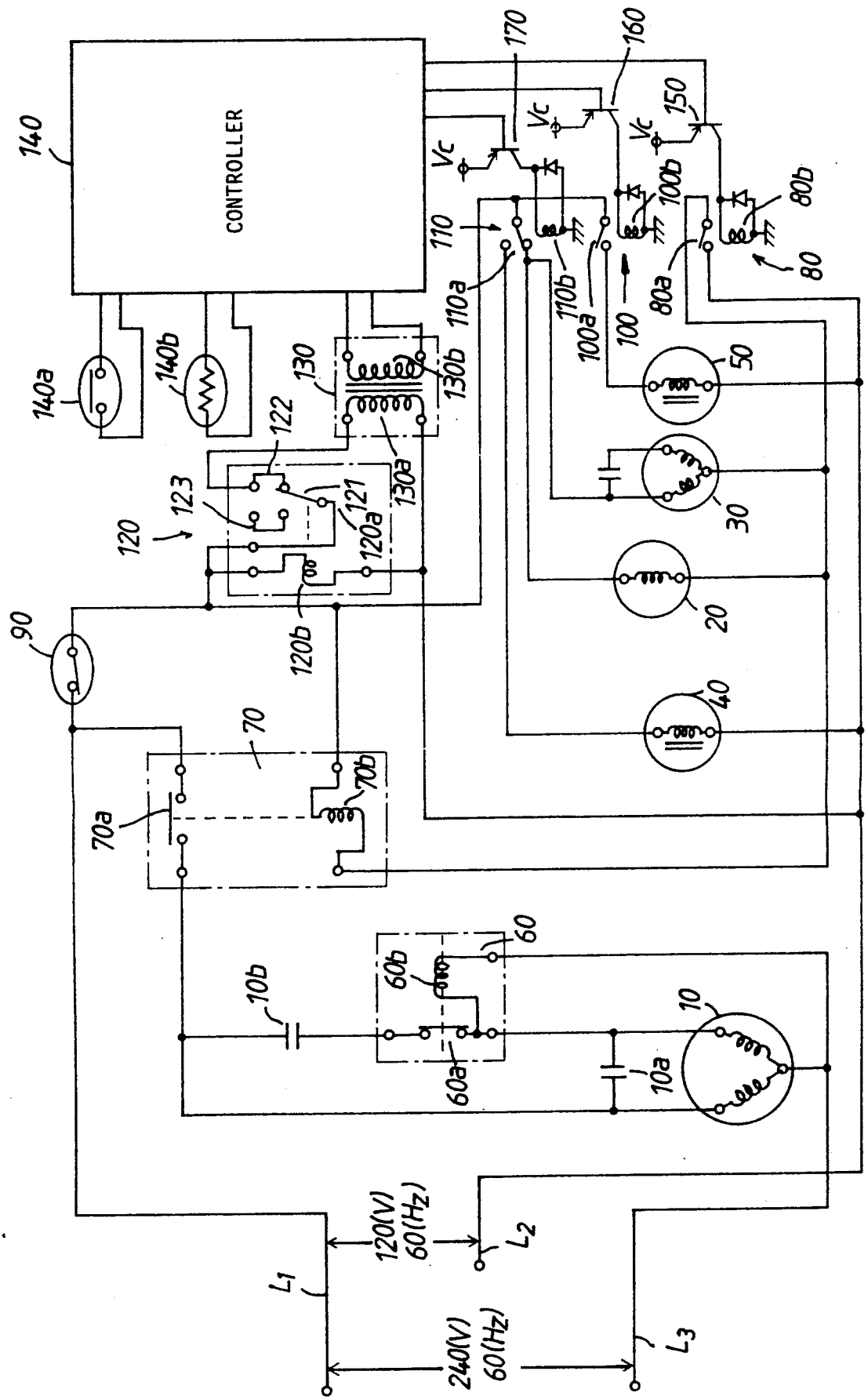

PROTECTIVE DEVICE FOR ELECTRIC CONTROL CIRCUITS

BACKGROUND OF THE INVENTION

1. Field of the Invention

The present invention relates to a protective device for electric control circuits, more particularly to a protective device for an electric control circuit of the type which includes a plurality of electrical loads different in input rating for connection to a commercially available source of electricity.

2. Discussion of the Prior Art

In an electric control circuit for an ice making machine, a single-phase three-wire system (for instance, 60 Hz, 120/240 V) is adapted as a commercially available source of electricity. In a refrigeration system of the ice making machine, a refrigerant compressor is driven by an electric motor the rating voltage of which is 240 volts, a cooling fan or blower for a condensing coil is driven by an electric motor the rating voltage of which is 120 volts, and a solenoid hot gas valve is arranged to be energized by the rating voltage of 120 volts. In the ice making machine, an electric motor of a water pump and a solenoid water valve are arranged to be energized by the rating voltage of 120 volts. Various electronic elements for control of the solenoid valves and motors are arranged to be activated under control of a transformer which is applied with the input rating voltage of 120 volts. To protect the electrical loads such as the motors and solenoid valves, the transformer is connected to the commercially available source of electricity through a fuse which is arranged to be melted when erroneously applied with the input rating voltage of 240 volts.

In the above arrangement, the fuse is useful to protect the electronic elements from damage caused by an error in connection to the commercially available source of electricity. It is, however, necessary to stock some spare fuses for replacement with the melted fuse. In the single-phase three-wire system, it is difficult to quickly discriminate as to whether or not the two input buses for 240 volts have been correctly selected from the three input buses. If the two input bases for 120 volts are connected in an error to the commercially available source of electricity to be applied with the input rating voltage of 240 volts, the fuse will be frequently disconnected. Moreover, the fuse will be disconnected due to aged variation thereof even when it is applied with a normal input rating voltage.

SUMMARY OF THE INVENTION

It is, therefore, a primary object of the present invention to provide a protective device capable of protecting the electric control circuit from abnormal high voltage caused by erroneous connection to the commercially available source of electricity without the provision of any conventional fuse.

According to the present invention, there is provided a protective device for an electric control circuit having first and second input buses to be applied with a source voltage of a low level from a commercially available source of electricity and an electrical load of a low rating voltage connected between the input buses. The protective device comprises an electrically operated switchover device disposed between the input buses and the electrical load for maintaining the electrical load in connection to the input buses when applied with the source voltage of low level and for disconnecting the electrical load from the input buses when applied with a source voltage of high level from the source of electricity, wherein the running voltage of the switchover device is determined to be higher than a maximum allowable voltage of the electrical load and to be lower than a lower limit value of the source voltage of high level.

In a practical embodiment of the present invention, the electric control circuit includes a transformer arranged to be applied with the source voltage of low level from the source of electricity through the input buses and a controller connected to a secondary winding of the transformer to be activated under control of the transformer for control of the electrical load. The switchover device is in the form of a switchover relay which includes a double-throw switch associated with a relay coil connected at its one end to the first input bus and at its other end to the second input bus, the double-throw switch having a movable contact normally retained in contact with a first fixed contact in connection to a primary winding of the transformer to be switched over from the first fixed contact to a second fixed contact in response to energization of the relay coil, and the running voltage of the relay coil being determined to be higher than a maximum allowable voltage of the electrical load and to be lower than a lower limit value of the source voltage of high level.

BRIEF DESCRIPTION OF THE DRAWING

Other objects, features and advantages of the present invention will be more readily appreciated from the following detailed description of a preferred embodiment thereof when considered with reference to the accompanying single drawing in which illustrated is an electric control circuit for an ice making machine provided with a protective device in accordance with the present invention.

DESCRIPTION OF THE PREFERRED EMBODIMENT

Disclosed in the drawing is an electric control circuit for an ice making machine which is designed to selectively activate first, second and third electric motors 10, 20 and 30 respectively for a refrigerant compressor, a cooling fan or blower associated with a condensing coil and a water pump and to selectively energize a solenoid hot gas valve 40 and a solenoid water valve 50. In the electric control circuit, the input rating voltage of motor 10 is determined to be 240 volts, while each input rating voltage of motors 20, 30 and solenoid valves 40, 50 is determined to be 120 volts.

The electric control circuit has three input buses $L_1$, $L_2$ and $L_3$ for connection to a commercially available power source of the single-phase three-wire type (60 Hz, 120/240). In this embodiment, the input buses $L_1$ and $L_2$ are arranged to be applied with a source voltage of 120 volts, while the input buses $L_1$ and $L_3$ are arranged to be applied with a source voltage of 240 volts. The first electric motor 10 is in the form of a single-phase condenser motor which is arranged to drive the refrigerant compressor when applied with the source voltage of 240 volts through input buses $L_1$, $L_3$ under control of a normally open switch 70a of a start relay 70. In the figure, the reference numerals 10a and 10b indicate running and drive capacitors of motor 10, respectively.

A start relay 60 for motor 10 includes a relay coil 60b which is connected at its one end to the input bus $L_3$ and at its other end to the input bus $L_1$ through the running capacitor 10a and start relay 70. Thus, the relay coil 60b is energized when applied with a line-to-line voltage between auxiliary windings of motor 10. The relay coil 60b is associated with a normally open switch 60a which is closed by energization of the relay coil 60b to be opened after a lapse of a predetermined period of time. The normally open switch 70a of start relay 70 is associated with a relay coil 70b which is connected at its one end to the input bus $L_2$ through a relay 80 and at its other end to the input bus $L_1$ through a thermostat switch 90 to be applied with the source voltage of 120 volts. When applied with the source voltage of 120 volts, the relay coil 70b is energized to close the normally open switch 70a. The relay 80 includes a normally open switch 80a associated with a relay coil 80b which is grounded at its one end and connected at its other to the collector of a transistor 150. When applied with a direct current voltage Vc in response to energization of transistor 150, the relay coil 80b is energized to close the normally open switch 80a. The thermostat switch 90 is arranged to be opened at a predetermined temperature when an ice stocker of the machine has been filled with ice cubes.

The electric control circuit further includes a relay 100 for the solenoid water valve 50 and a relay 110 for the motors 20, 30 and for the solenoid hot gas valve 40. The relay 100 includes a relay coil 100b associated with a normally open switch 100a which is connected at its one end to the input bus $L_2$ through the solenoid water valve 50 and at its other end to the input bus $L_1$ through the thermostat switch 90. The relay coil 100b is grounded at its one end and connected at its other end to the collector of a transistor 160. When applied with the direct current voltage Vc in response to energization of the transistor 160, the relay coil 100b is energized to close the normally open switch 100a. The relay 110 includes a relay coil 110b associated with a double-throw switch 110a which is arranged to connect the input bus $L_1$ to the input bus $L_2$ through the motors 20, 30 and relay 80 when it is retained in a first position during deenergization of the relay coil 110b. The relay coil 110b is grounded at its one end and connected at its other end to the collector of a transistor 170. When applied with the direct current voltage Vc in response to energization of the transistor 170, the relay coil 110b is energized to switch over the double-throw switch 110a from the first position to a second position thereby to connect the input bus $L_1$ to the input bus $L_2$ through the solenoid hot gas valve 40.

A protective device for the electric control circuit is in the form of a relay 120 which includes a double-throw switch 120a associated with a relay coil 120b. The double-throw switch 120a has a movable contact 121 which is connected to the input bus $L_1$ through the thermostat switch 90. During deenergization of the relay coil 120b, the movable contact 121 is retained in contact with a first fixed contact 122 which is connected to a primary winding 130a of a transformer 130. The relay coil 120b is connected at its one end to the input bus $L_1$ through the thermostat switch 90 and at its other end to the input bus $L_2$. When applied with the source voltage of 120 volt through the input buses $L_1$ and $L_2$, the relay coil 120b is energized to switch over the movable contact 121 of switch 120a from the first fixed contact 122 to a second fixed contact 123. Taking into account of the facts that a maximum allowable voltage of 120 volts plus 10% is applied to each of electric motors 20, 30 and solenoid valves 40, 50 connected between the input buses $L_1$ and $L_2$ and that the source voltage of 240 volts fluctuates in a range of 240 volts plus 10% and minus 22% while the source voltage of 120 volts fluctuates in a range between 120 volts plus 20% and minus 20%, a minimum running (operating) voltage of relay 120 is determined to be higher than a maximum allowable voltage of the transformer 130 and to be lower than the source voltage of 240 volts minus 22%. A maximum allowable voltage of relay 120 is determined to be higher than the source voltage of 240 volts plus 10%.

The primary winding 130a of transformer 130 is connected at its one end to the input bus $L_2$ and at its other end to the first fixed contact 122 of switch 120a as described above. When applied with the source voltage of 120 volts through the input bus $L_2$, double-throw switch 120a, thermostat switch 90 and through the input bus $L_1$, the transformer 130 generates a transformed voltage at its secondary winding 130b. An electronic controller 140 is arranged to convert the transformed voltage from transformer 130 into a direct current voltage and is activated under the direct current voltage to energize the transistors 150, 160 and 170 in accordance with operation of a float switch 140a of the normally open type and a thermistor 140b. The float switch 140a is arranged to be opened when the ice formation has been completed in the ice making machine. The thermistor 140b is arranged to detect the temperature of a freezing chamber (not shown) in the ice making machine when a defrost operation has finished.

Assuming that the input buses $L_1$ and $L_2$ are connected in a correct manner to the commercially available source of electricity to be applied with the source voltage of 120 volts, the transformer 130 is applied with the source voltage of 120 volts at its primary winding 130a through the input bus $L_1$, thermostat switch 90 and the double throw switch 120a of relay 120 and through the input bus $L_2$. In this instance, the relay coil 120b of relay 120 is also applied with the source voltage of 120 volts through the thermostat switch 90. Since the minimum running (operating) voltage of relay 120 is determined to be higher than the maximum allowable voltage of transformer 130, the relay coil 120b is maintained in its deenergized condition. Thus, the transformer 130 generates a normally transformed voltage at its secondary winding 130b, and in turn, the controller 140 cooperates with the float switch 140a and thermistor 140b under supply of the transformed voltage to selectively energize the transistors 150, 160 and 170. As a result, the motors 20, 30 and solenoid valves 40, 50 are selectively activated by the source voltage of 120 volts applied thereto through the respective relays 80, 100 and 110 to effect the freezing and defrost operations of the ice making machine.

When the input buses $L_1$ and $L_2$ are connected in an incorrect manner to the commercially available source of electricity to be applied with the source voltage of 240 volts, the relay coil 120b of relay 120 is applied with the source voltage of 240 volts through the thermostat switch 90. Since the maximum allowable voltage of relay 120 is determined to be higher than 240 volts plus 10%, the movable contact 121 of double-throw switch 120a is switched over to the second fixed contact 123 in response to energization of the relay coil 120b. As a result, the primary winding 130a of transformer 130 is disconnected from the input bus $L_1$ to maintain the controller 140 in its deactivated condition.

As is understood from the above description, the relay 120 acts to instantanously disconnect the transformer 130 from the input bus $L_1$ when applied with the source voltage of 240 volts through input buses $L_1$, $L_2$ in an error. This is useful to protect the transformer 130 and controller 140 from abnormal high voltage caused by erroneous connection to the commercially available source of electricity.

Although in the above embodiment, the present invention has been adapted to an electric control circuit for an ice making machine, it is obvious that the present invention can be adapted to various electric control circuits including a plurality of electrical loads different in input rating for connection to a commercially available source of electricity.

What is claimed is:

1. A protective device for an electric control circuit having first and second input buses to be applied with a low level source voltage from a commercially available source of electricity supplying low and high level source voltages, a transformer having primary and secondary windings and arranged to be applied with the low level source voltage through said input buses, and a controller connected to said secondary winding of said transformer to be activated under control of said transformer, said controller controlling at least one electrical device which provides an electrical load of a low rating voltage, said at least one electrical device connected between said input buses, the protective device comprising:

electrically operated switchover means for maintaining connection of said electric control circuit to said input buses when said first and second input buses are applied with said low level source voltage and for disconnecting said electric control circuit when applied with said high level source voltage, said electrically operated switchover means including
 a relay coil connected at one end to said first input bus and connected at another end to said second input bus, and
 a double-throw switch associated with said relay coil, said double-throw switch having
  a first fixed contact connected to said primary winding of said transformer,
  a second fixed contact, and
  a movable contact normally retained in contact with said first fixed contact, said movable contact to be switched over from the first fixed contact to said second fixed contact in response to energization of said relay coil, wherein an operating voltage of said relay coil is higher than an upper limit fluctuation value of said low level source voltage and is lower than a lower limit fluctuation value of the high level source voltage.

2. A protective device for an electric control circuit having first and second input buses to be applied with a low level source voltage from a commercially available source of electricity supplying low and high level source voltages, a transformer having primary and second windings and arranged to be applied with the low level source voltage through said input buses, and a controller connected to said secondary winding of said transformer to be activated under control of said transformer, said controller for controlling at least one electrical device which provides an electrical load of a low rating voltage, said at least one electrical device connected between said input buses, the protective device comprising:

electrically operated switchover means for maintaining connection when applied with said low level source voltage and for disconnection when applied with said high level source voltage, said electrically operated switchover means including
 a relay coil connected at one end thereof to said first input bus and at another end thereof to said second input bus, and
 a double-throw switch associated with said relay coil, said double-throw switch having
  a first fixed contact connected to said primary winding of said transformer,
  a second fixed contact, and
  a movable contact normally retained in contact with said first fixed contact, said movable contact to be switched over from the first fixed contact to said second fixed contact in response to energization of said relay coil, wherein a minimum operating voltage of said relay coil is higher than a maximum allowable voltage of said transformer and is lower than a lower limit fluctuation value of the high level source voltage, and a maximum allowable voltage of said relay coil is higher than an upper fluctuation value of the high level source voltage.

3. A protective device according to claim 1 wherein said low level source voltage is 120 V.

4. A protective device according to claim 2 wherein said low level source voltage is 120 V.

5. A protective device according to claim 1 wherein said high level source voltage is 240 V.

6. A protective device according to claim 2 wherein said high level source voltage is 240 V.

* * * * *